United States Patent
Männer

[11] Patent Number: 5,811,140
[45] Date of Patent: Sep. 22, 1998

[54] NEEDLE VALVE NOZZLE WITH A NEEDLE GUIDE

[76] Inventor: Otto Männer, Unter Gereuth 9, 79353 Bahlingen, Germany

[21] Appl. No.: 789,352

[22] Filed: Jan. 27, 1997

[30] Foreign Application Priority Data

Feb. 13, 1996 [DE] Germany .................. 196 04 209.2

[51] Int. Cl.$^6$ .................................................. B29C 45/23
[52] U.S. Cl. ........................................... 425/564; 425/566
[58] Field of Search ..................... 425/566, 564, 425/562

[56] References Cited

U.S. PATENT DOCUMENTS

| | | | |
|---|---|---|---|
| 4,705,473 | 11/1987 | Schmidt | 425/566 |
| 4,832,593 | 5/1989 | Brown | 425/566 |
| 5,288,225 | 2/1994 | Schmidt et al. | 425/566 |

FOREIGN PATENT DOCUMENTS

| | | |
|---|---|---|
| 0 374 346 B1 | 5/1993 | European Pat. Off. . |
| 3245571 C2 | 4/1985 | Germany . |
| 3833220 A1 | 4/1990 | Germany . |

*Primary Examiner*—Tim Heitbrink
*Attorney, Agent, or Firm*—Panitch Schwarze Jacobs & Nadel, P.C.

[57] ABSTRACT

A needle valve nozzle (1) with a nozzle housing (3), a needle valve (10) arranged axially displaceably in it in the center, and a needle guide (4) constructed as a bushing, has its material feed channel (5) completely in the interior of this needle guide (4). The needle guide (4) has a corresponding radial dimension on the face (11) of the needle valve nozzle (1) and of the nozzle housing (3), and jointly forms the face (11). It is furthermore provided that this bushing-like needle guide (4) has an insulating spacing from nozzle housing (3), in particular on its exterior, preferably with the aid of an air gap, so that a heat outflow though the nozzle housing (3) and its abutment (16) is largely ruled out.

13 Claims, 1 Drawing Sheet

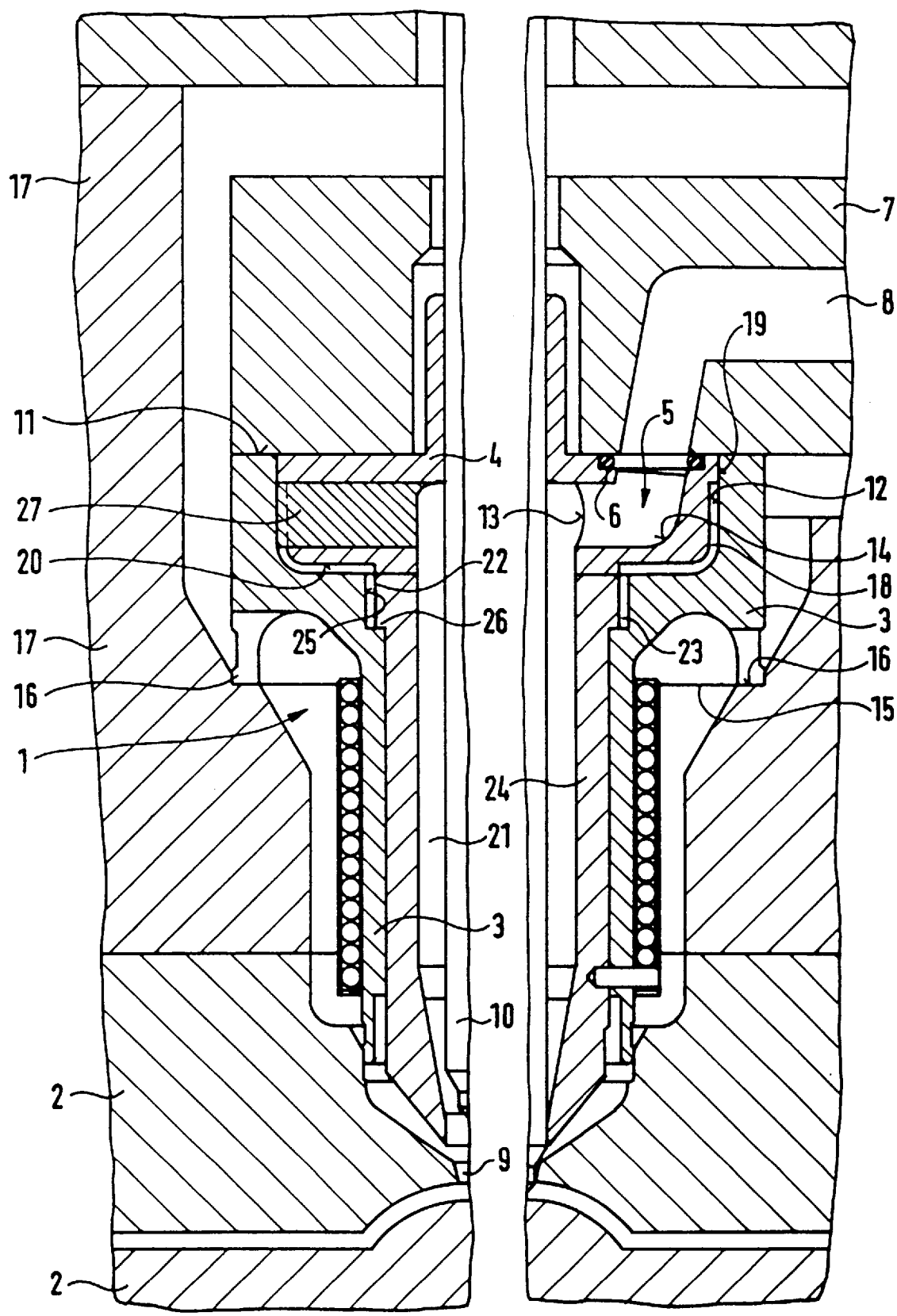

NEEDLE VALVE NOZZLE WITH A NEEDLE GUIDE

BACKGROUND OF THE INVENTION

The invention concerns a needle valve nozzle for injection molding with a nozzle housing, with a needle guide constructed as a bushing reaching at least partly into it, as well as with a channel for feeding material into the interior of the nozzle housing, which channel opens on that face of the needle valve nozzle which faces away from the nozzle outlet and abuts on a high temperature channel manifold in the operating position, wherein the needle guide is installed in the area of this face, forming at least one part of the face, and extending axially from the face into a recess for the nozzle housing, and wherein the material feed channel is oriented on the face, entering into the area wherein it opens into the interior of the nozzle housing transverse to the longitudinal extension of the valve needle, the channel having a change in direction or bend in the course of its entry into the opening, and wherein the nozzle housing undergoes a reduction in diameter (relative to the face) at a distance from the face, and the heel facing away from the face of the housing which is of greater diameter forms or has an abutment for supporting the injection mold on or in a mold plate.

A needle valve nozzle of this type is known from EP-0 374 346 B1. Therein, the inlet into the channel for supplying material on the face of the needle valve nozzle is arranged adjacent to the needle guide. From there, this channel runs via a change in direction to its opening, which is situated axially below or adjacent to the end of the needle guide opposite the face. The channel must to a certain extent run around the needle guide. It thereby extends (and especially the region of its change in direction or bend) very near to the abutment from where cold can flow in or heat can flow out. It has been shown that the channel for material introduction can be so drastically cooled off that the formation of hazes occurs in the materials supplied. This takes place due to the fact that the material supplied partly cools off because of the indicated heat emission, so that with every new injection process such cooled material can be swept out of the channel and then leads to hazes and/or flow lines within the mold part which means a weakening or even a preprogrammed site of a fracture of the shaped parts produced.

This problem is avoided in connection with a needle valve nozzle of another type in accordance with DE-32 45 571 C2 by situating the needle guide outside the needle valve nozzle in the high temperature channel manifold. This leads, however, to the needle guide being exposed to heat transfers of the high temperature channel manifold, which can have a harmful effect upon the needle itself. A basically more precise guiding of the needle independently of such heat transfers results if the needle guide extends at least partially into the needle valve nozzle.

SUMMARY OF THE INVENTION

There thus exists the object of creating a needle valve nozzle of the type initially mentioned in which the advantage of the needle guide extending at least partially into the nozzle housing remains, but nevertheless avoids the danger of haze formation by cooling in the channel.

The solution to this apparently contradictory objective comprises running the material feed channel from its entry into the face to its exit in the interior of the housing through the needle guide, which radially forms one part of the face of the needle valve nozzle, and by arranging an insulation between the exterior of the bushing constituting the needle guide and the recess of the nozzle housing which accommodates this bushing, at least in the area adjacent to its abutment.

Thus, in an unusual manner, the material supply channel is shifted within the needle valve nozzle into the needle guide. This makes it possible to provide an insulation by means of which this channel is shielded from the abutment and the contact area of the nozzle with the mold plate. A flow of heat from the channel by way of the contact area of the abutment into the mold plate is thereby diminished to such an extent that a haze formation due to partial hardening of the supplied material can be avoided, chiefly in the area where the channel changes direction.

At the same time, it is particularly suitable if the insulation is arranged between the abutment and the area or part of the needle guide which contains the change in direction of the channel. It is precisely in the area where the material being supplied is especially in danger of hardening if too much heat should flow off, which is avoided, however, by means of the insulation shielding this area.

An especially appropriate and advantageous embodiment of the invention comprises providing an air gap as insulation between the needle guide and the nozzle housing accommodating the needle guide. With the previously known solutions, the needle guide is inserted into the nozzle housing as seamlessly as possible. Hence, it is unexpected to provide an air gap instead of this, which nonetheless can be constructed in a simple manner and which represents an effective insulation, without requiring additional parts of insulating material, so that no additional expenditure arises during assembly for the insertion of an insulating part.

It is advantageous for the greatest possible effectiveness in shielding the channel from the abutment if the insulation or the air gap is uninterrupted in the area where the material supply channel changes direction or bends, and extends to an especially cylindrical fitting surface situated in the nozzle housing recess where the needle guide and nozzle housing touch. This fitting surface is situated adjacent to the face of the needle valve nozzle and its housing between this face and the insulation and the air gap. The bushing comprising the needle guide is thus fitted into the recess of the nozzle housing immediately in the face area, wherein however the corresponding fitting surface has only a small axial extension, because the insulation according to the invention, preferably an air gap, is then arranged in immediate axial connection thereon. In this way, the needle guide is fitted into the nozzle housing, but is nevertheless sufficiently or well insulated in the important zone for shielding against the "cold" abutment region.

The bushing which constitutes the needle guide can have a cylindrical or somewhat conical shape proceeding from the face, and can extend axially to below the channel running in it and be bounded below this channel by an underside running approximately parallel to the face. The insulation or the air gap can extend from the approximately cylindrical or conical exterior surface to below this underside and end in a radial direction at a distance before the inner cavity of the nozzle housing which contains the valve needle. A practically bowl or basin-shaped insulation thereby arises which, of course, leaves its interior center free. In this connection, "underside" means the limit of the bushing forming the needle guide which runs parallel to the face in the interior of the nozzle housing, and which is situated closer to the outlet opening of the needle valve nozzle than the face. Such needle valve nozzles can also be arranged with their outlet opening upward so that the "underside" lies higher than the face in such an arrangement.

It is possible to improve the insulation by the insulation or the insulating air gap having an axial continuation thereof proceeding from its edge or end lying radially inward on the underside of the needle guide, which continuation extension extends axially approximately to the cross sectional plane of the needle valve nozzle in which the abutment or a supporting surface forming this is arranged, or ends axially somewhat in front of or behind this. A radial section through the insulation or the air gap then reveals approximately an S or Z shape by means of which the abutment area is shielded as best as possible from the channel and the needle guide.

In order to accommodate the previously mentioned continuation of the insulation or the air gap especially simply in terms of construction, it is suitable for the nozzle housing to contain between itself and an inner area which accommodates the needle valve and the casting material a nozzle body which encloses this inner area, which body in particular lies seamlessly on the inside or the nozzle housing. It is also suitable if this nozzle body extends to the underside of the needle guide and lies against this with its end opposite to the outlet opening or nozzle opening, and if the continuation of the insulation or insulating air gap which runs axially is arranged between this nozzle body and the housing. The nozzle housing is hence practically constructed in two parts in that it still contains the nozzle body proper in its interior, which overall likewise diminishes a transfer of heat from the interior of the nozzle outward, whereby this bipartite character can be used so as to be able to provide the continuation of the insulation in a simple manner by means of a further air gap.

The air gap between the needle guide and nozzle housing can be simply constructed by a shallow cutout or recess located on the exterior of the needle guide. To be sure, the recess could also be cutout somewhat facing the exterior of the needle guide. This would, however, make an undercut necessary in the area of the fitting surface located near the face. It is simpler to provide the bushing forming the needle guide with a corresponding external recess.

The continuation of the air gap between nozzle housing and nozzle body can be constructed by a cutout or recess in the nozzle housing. This is suitable above all when the axial continuation of the insulating ring-shaped air gap corresponds to the axial length of a diameter enlargement or of a collar of the nozzle body, whereby the nozzle body whereby is axially fixed against the nozzle housing, and when the air gap is arranged on the exterior of this enlargement in diameter. The possibility of continuing the air gap without requiring additional expensive measures then arises practically at the place for accommodating the nozzle housing collar. The appropriate opening for the collar need only be constructed somewhat larger radially than this collar, so that the insulating air gap then arises practically automatically.

It was already mentioned that the insulation between the needle guide and the housing can have a continuation which is situated between the nozzle body and the nozzle housing. It is especially appropriate thereby when the insulations between needle guide and the nozzle housing on the one hand and between the nozzle body and nozzle housing on the other are connected with each other and extend into each other, and when the air gap forming this insulation is basically constructed rotationally symmetrical to the central axis of the needle valve nozzle. The abutment of the housing can thereby be thermally shielded from the needle guide and the channel for material or raw material supply practically without interruption, as can the upper entry area or the opening of the channel into the interior of the nozzle housing.

The bushing forming the needle guide with the bent material supply channel arranged in its interior can be a one piece casting, especially a high quality casting. In this way, the needle guide with the channel situated in its interior can be produced in a suitable manner.

It is also, however, possible for the bent material supply feed channel to be built into the needle guide by two bores, especially dead end bores, meeting in the area of the change in direction, and for the bore which runs radially through a diameter in the operating position to be subsequently sealed, for example with a pressed in or screwed in stopper, on its side facing away from the change in direction. Consequently, the needle guide can also be manufactured from a material which is not suited or not well suited to casting.

In sum, there results a needle valve nozzle of the known type which retains the advantage of the needle guide being arranged in the nozzle housing of the needle valve nozzle independently of the heat movements motions of the high temperature channel manifold, but nevertheless can avoid the formation of a haze in the material supply channel, because this channel is situated in the interior of this needle guide and is shielded from the "cold" areas of the needle valve nozzle, especially of its abutment against the mold plate, by means of an insulation provided on the exterior of this needle guide.

BRIEF DESCRIPTION OF THE SEVERAL VIEWS OF THE DRAWING

The foregoing summary, as well as the following detailed description of preferred embodiment of the invention, will be better understood when read in conjunction with the appended drawing. For the purpose of illustrating the invention, there is shown in the drawing an embodiment which is presently preferred. It should be understood, however, that the invention is not limited to the precise arrangements and instrumentalities shown. In the drawing:

The sole FIGURE depicts in somewhat schematic representation a longitudinal section of a needle valve nozzle according to the invention in the installed state, wherein one part of the high temperature channel manifold and the mold plate as well as a part of the mold insert are also shown.

DETAILED DESCRIPTION OF THE INVENTION

A needle valve nozzle, designated as a whole as 1, for injection molds 2 has a nozzle housing 3 and a needle guide constructed as a bushing 4, which partially extends into the housing into and a material supply channel 5, to be described later in further detail, which in the installed state is sealed off with the aid of a sealing ring 6 against a high temperature channel manifold 7 and a feed channel 8 situated therein.

The needle valve nozzle 1 is provided with an outlet opening 9 in a known manner to introduce the injection molding material into the injection mold. This outlet opening 9 is closed with the aid of a needle valve 10, and can be opened by axial withdrawing of the needle valve 10 which runs through the middle of the needle valve nozzle 1 in a known manner.

The channel 5 opens into the needle valve nozzle on its face 11 which faces away from the nozzle outlet with the outlet opening 9, and in the operating position bears against the high temperature channel manifold 7, as one well recognizes in the drawing. At the same time, the feed channel 8 of the high temperature channel manifold 7 exits where the channel 5 opens into the face 11.

At the same time, the bushing-like needle guide 4 is situated in the region of this face 11. It forms a part of the face 11, and extends out axially from the face 11 into a recess 12 of the nozzle housing 3 which accommodates it.

The material supply channel 5 enters the needle valve nozzle 1 at the face 11 and assumes such a direction in the interior that its region leading to its exit 13 is oriented at right angles to the longitudinal extension of the needle valve 10, so that a change in direction 14, for example a bend, occurs in the course of its progression to the opening 13, which one clearly recognizes in the drawing, since the section through the middle of the needle nozzle valve 1 is so arranged that it also runs through the middle of the channel 5.

In the usual manner, the nozzle housing 3 has a reduction in diameter at a distance from its face 11 in comparison to the latter, so that facing away from the face a larger diameter heel 15 of the housing 3 forms or has an abutment 16 for supporting the housing on or in a mold plate 17 of the injection mold 2. The housing in turn supports a fitting surface 19.

At the same time, one recognizes in the drawing that the material feed channel 5 (in continuation of the channel 8 located in the high temperature channel manifold 7) runs from its opening in the face 11 to its exit 13 in the interior of the housing 3 through the needle guide 4, which constitutes a part of the face 11 of the needle valve nozzle 1 in a radial direction. This means that the needle guide 4 assumes a double function, in that on the one hand it serves further to guide the needle valve 10, and on the other hand it completely accommodates this channel 5 within itself.

One recognizes in addition that an insulation 18 is installed in the area adjacent to the abutment 16 between the exterior of the bushing forming the needle guide 4 and the recess 12 of the nozzle housing 3 accommodating this guide. In this embodiment, the insulation 18 is constructed as an air gap, which is therefore hereafter also designated as "air gap 18". This measure prevents a heat loss arising though the nozzle housing 3 and the abutment 16 by means of heat from the heated material in the mold plate 17 being able to flow off to such an extent that the material in the channel 5 possibly hardens or forms hazes. Hence, a heat outflow by way of the abutment 16 can at least be prevented to the extent that the material remains fluid by situating the channel 5 and the change in direction 14 in the needle guide 4 and shielding it with the aid of insulation 18.

Thus, in this embodiment the insulation 18 is situated between the abutment 16 and the area containing the change in direction 14 of the channel 5 or pair of the needle guide 4 where the danger of haze formation would otherwise be especially large. To avoid an excessive cooling within the channel 5, the channel 5 is thus shifted into the bushing-like needle guide 4 in an unusual manner, and this is insulated against the nozzle housing 3.

At the same time, one clearly recognizes that the air gap 18 which forms the insulation is uninterrupted in the area of the change in direction 14 or bend of the channel 5, because the needle guide 4 is braced and centered outside of this insulation area in the nozzle housing 3. This centering and bracing transpires with the aid of a cylindrical fitting surface 19 situated in the recess 12, up to which the air gap 18 extends and on which the needle guide 4 and the nozzle housing 3 make contact. At the same time, this fitting surface 19 is installed adjacent to the face 11 of the needle valve nozzle 1 and its housing 3 between this face 11 and the insulation 18. This contact between the nozzle housing 3 and the needle guide 4 is thus situated at the greatest distance possible from the abutment 16.

The bushing which forms the needle guide 4 has, proceeding from the face 11, a cylindrical or almost conical form, and extends axially (with the form of representation selected in the drawing) until below the channel 5 running in it, so that it accommodates the channel 5 completely within itself. It is bounded beneath this channel 5 by an underside 20 running approximately parallel to the face 11, whereby with a reversed arrangement of the needle valve nozzle 1, or an arrangement rotated 180°, this "underside 20" could even come to lie above the face 11 or at approximately the same height with this.

The air gap 18 thereby reaches from the approximately cylindrical or conical outer surface which extends below the fitting surface 19 to below this underside 20, and ends in a radial direction at a radial distance in front of the inner cavity 21 of the nozzle housing 3 which contains the needle valve 10. This insulating air gap 18 consequently largely follows the bent path of the channel 5 and above all shields its exterior side, which forms the boundary of the needle guide 4, well against the nozzle housing 3 and above all from the abutment 16.

The insulating action is improved in this embodiment by the insulating air gap 18 having an axial continuation 23 proceeding from its radially interior edge 22 the underside 20 of the needle guide 4 and extending axially to about the cross-sectional plane of the needle valve nozzle 1 in which the abutment 16 is situated, or (as in the embodiment shown) ends somewhat before it. It could, however, even extend axially beyond this cross-sectional plane. Since the area of the abutment 16 is hollowed out in this embodiment and has recesses to thereby diminish the transfer of heat to the mold plate 17 already thereby, the relatively small axial extension of this continuation 23 in this embodiment can even suffice to achieve the desired improvement of the insulating action.

The nozzle housing 3 could indeed consist of one piece. In this embodiment, however, the housing contains a nozzle body 24 lying seamlessly on the interior of the nozzle housing 3 between itself and the needle valve 10 and the interior area 21 which accommodates the casting material, which body encloses this interior space. This nozzle body 24 reaches to the underside 20 of the needle guide 4 with its end opposite to the outlet opening 9 or nozzle exit and braces this axially, in that it bears against it. In this embodiment, the axially running continuation 23 of the insulation 18 which is likewise constructed as an air gap, is arranged between this nozzle body 24 and the housing 3.

While the air gap 18 is formed between the needle guide 4 and the nozzle housing 3 by a shallow hollow located on the exterior of the needle guide 4, the continuation 23 of the air gap between the nozzle housing 3 and the nozzle body 24 is formed by a cutout or recess 25 in the nozzle housing.

One clearly recognizes in the drawing that the dimension of the continuation 23 of the insulating air gap 18 corresponds to the axial length of a diameter enlargement or of a collar 26 of the nozzle body 24, whereby the nozzle body 24 is axially fixed and braced against the nozzle housing 3 in the recess 25. The continuation 23 of the air gap is situated on the exterior of this enlargement in diameter, that is on the exterior of this collar 26, and continues without interruption into the air gap 18 on the underside 20 of the needle guide 4. The insulations between the needle guide 4 and the nozzle housing 3 on the one hand and between the nozzle body 24 and the nozzle housing 3 on the other are thus connected with each other and extend into each other. The air gap which comprises these insulations is at the same time constructed rotationally symmetrically, which principally permits a simple manufacture.

The bushing forming the needle guide 4 could be a one-piece high quality casting with the bent channel 5 located in its interior. In the embodiment shown, however the material supply channel 5 is formed in into the needle guide 4 by two meeting bores in the area of the change in direction 14. In this connection, these bores do not necessarily need to be made with a drill, but could also be created by other processes, perhaps even a casting process. In the case of a boring, it is essential that the bore which in the operating position runs approximately radially through a diameter subsequently be sealed on its side facing away from the change in direction 14, for example with a pressed in or screwed in stopper 27. Consequently, the channel 5 can be produced without difficulty, either with a drill or in a casting process, and can then be restricted to the length range essential for its function.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A needle valve nozzle (1) for injection molds (2) comprising a nozzle housing (3) having a needle guide (4) constructed as a bushing which extends at least partially into the housing, the needle guide (4) having an aperture for guiding a needle valve (10) and a material supply channel (5) leading into an interior cavity (21) of the housing (3) which contains the needle valve (10) lying in an axial direction, the channel (5) entering an entry opening in a face (11) of the needle valve nozzle (1) which faces away from a nozzle outlet opening (9) and being alignable with a high-temperature channel manifold (7) in an operating position, the needle guide (4) being arranged in a region of the face (11) and forms at least a part of the face (11) in a radial direction and including a portion which extends axially away from the face (11) into a recess (12) of the nozzle housing (3), the channel (5) having a portion oriented transverse to a longitudinal extension of the needle valve (10) in a region of an opening (13) into the interior cavity (21) of the housing (3) and the channel (5) having a channel course which undergoes a change in direction (14) from entering the entry opening in the face (11) to the opening (13), the nozzle housing (3) having a diminution in diameter at a distance from the face (11) and in comparison with the face and a heel facing away from the face (11), the heel being of larger diameter than the diminution and having an abutment (16) for supporting the housing (3) in a mold plate (17) of an injection mold (2) wherein the channel (5) runs from the entry opening in the face (11) to the opening (13) into the interior of the housing (3) through the needle guide (4), and wherein an insulation (18) is arranged at least in a region of the housing (3) adjacent to the abutment (16) between an exterior of the bushing and a recess (12) in the nozzle housing (3) for accommodating the bushing, the insulation (18) being situated between the abutment (16) and a region of the needle guide (4) which contains the change in direction (14) of the channel (5).

2. The needle valve nozzle according to claim 1, wherein the insulation (18) is uninterrupted in the region of the change in direction (14) of the material feed channel (5) and extends up to a fitting surface (1) situated in the recess (12), where the needle guide (4) and the nozzle housing (3) touch, the fitting surface (19) being situated adjacent to the face (11) between the face (11) and the insulation (18).

3. The needle valve nozzle according to claim 2, wherein the fitting surface (19) is cylindrical in shape.

4. The needle valve nozzle according to claim 2, wherein the bushing has a cylindrical or somewhat conical shape proceeding from the face (11) and extends axially to below the channel (5), the bushing being bounded below the channel (5) by an underside (20) running approximately somewhat parallel to the face (11), and wherein the insulation (18) extends from the fitting surface (19) to below the underside (20) and ends at a radial distance in front of the interior cavity (21).

5. The needle valve nozzle according to claim 4, wherein the insulation (18) has an axial continuation (23) proceeding from an edge of the insulation radially inward (22) on the underside (20) of the bushing and extending axially until approximately a transverse cross sectional plane of the needle valve nozzle (1) in which the abutment (16) is mounted.

6. The needle valve nozzle according to claim 5, wherein a nozzle body (24) is located between the nozzle housing (3) and the interior cavity (21), the nozzle body (24) enclosing the cavity (21) and lying against the interior of the nozzle housing (3), and wherein the nozzle body (24) has an end opposite the nozzle outlet opening (9) which extends to and bears against the underside (20) and wherein the axial continuation (23) of the insulation (18) is arranged between the nozzle body (24) and the housing (3).

7. The needle valve nozzle according to claim 1, wherein insulation (18) comprises an air gap.

8. The needle valve nozzle according to claim 7, wherein the air gap (18) is formed by a shallow cutout located on the exterior of the bushing.

9. The needle valve nozzle according to one of claim 8, wherein a continuation (23) of the air gap is formed by a recess (25) in the nozzle housing (3) located between the nozzle housing (3) and a nozzle body (24) which encloses the interior cavity (21).

10. The needle valve nozzle according to claim 9, wherein an axial dimension of the continuation (23) corresponds to an axial length of a collar (26) formed by an enlarged diameter of the nozzle body (24), the collar (26) serving to fix the nozzle body (24) axially against the nozzle housing (3), and the air gap being located around an exterior of collar.

11. The needle valve nozzle according to claim 9, wherein the insulation (18) and the continuation (23) are connected with each other and extend into each other, and wherein the air gap forming the insulation and the continuation is constructed essentially rotationally symmetrically.

12. The needle valve nozzle according to claim 1, wherein the bushing is formed as a one piece casting, having a bent material supply channel (5) arranged in an interior of the bushing.

13. The needle valve nozzle according to claim 1, wherein the material supply channel (5) is formed by two bores in the needle guide (4) which meet in the region of the change of direction (14), and wherein in an operating position a bore traversing a diameter of the needle guide (4) in an approximately radial direction is sealed with a stopper (27) on an end of the base facing away from the change in direction (14).

* * * * *